Sept. 30, 1969     D. M. JACKSON ET AL     3,469,850
PACKING FOR A FLUID JOINT
Filed Feb. 25, 1966
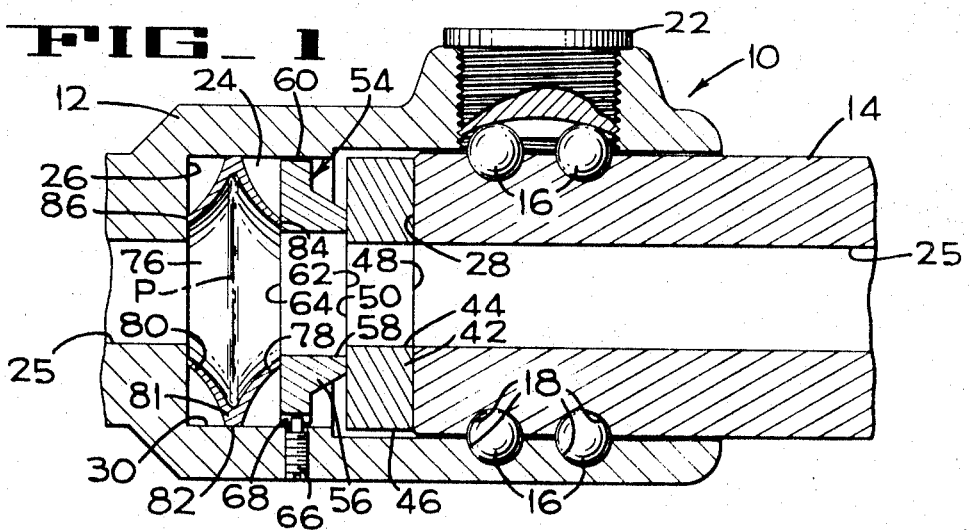
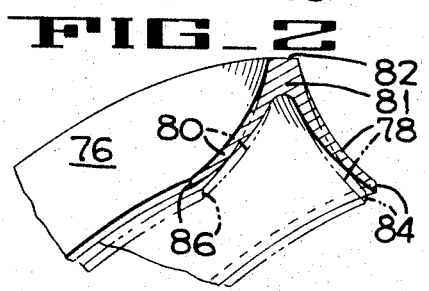
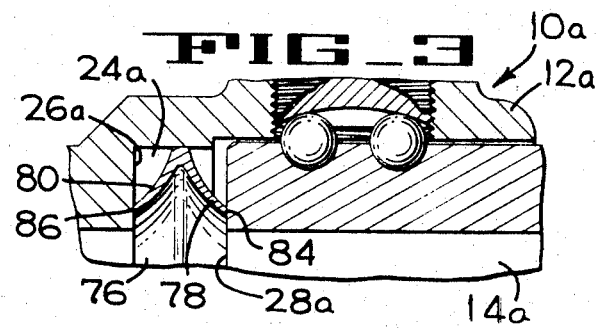
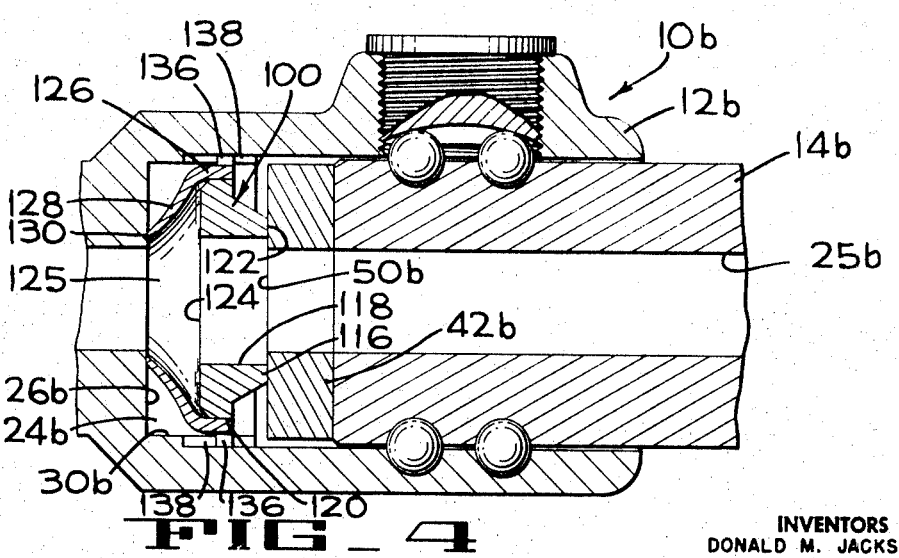
INVENTORS
DONALD M. JACKSON
JOSEPH F. GIERUT
BY *Francis W. Anderson*
ATTORNEY United States Patent Office 3,469,850
Patented Sept. 30, 1969

3,469,850
PACKING FOR A FLUID JOINT
Donald M. Jackson, Whittier, and Joseph F. Gierut, Fullerton, Calif., assignors to FMC Corporation, San Jose, Calif., a corporation of Delaware
Filed Feb. 25, 1966, Ser. No. 530,223
Int. Cl. F16j 15/34, 15/32
U.S. Cl. 277—83          5 Claims

ABSTRACT OF THE DISCLOSURE

A packing for a fluid conduit swivel joint or the like, including an annular flexibly resilient pressure extensible member with at least one annular inwardly bowed and tapered flange of generally frusto-conical configuration extending radially inwardly from an outer annular rim, and in two embodiments an annular rigid member providing a bearing surface for the end sealing face of the flange.

---

The present invention pertains to a packing for a fluid joint and more particularly relates to a packing which is capable of maintaining a fluid-tight seal in a swivel joint employed in a fluid system handling corrosive or destructive fluids that are under very high pressure when the fluid and ambient temperatures vary within a wide range.

High altitude aircraft and missiles commonly employ swivel joints in their fluid systems, used in conducting fluids such as silicate ester hydraulic fluid and nitric acid. A wide range of pressures and temperatures are encountered in the handling of fluids of these types in such craft. For instance, the fluid pressures involved may be in the order of fifteen hundred p.s.i.g. to forty-five hundred p.s.i.g. or more. During such times the temperature of the fluids may vary between a low of minus sixty-five degrees F. to a high of plus three hundred degrees F. while the ambient temperature may vary from a sub zero F. reading to a plus one hundred degrees F. It is apparent that although these fluids while under normal pressure and temperature conditions are destructive in varying degrees to fluid packings of elastomeric composition, they are even more so under the pressure and temperature conditions mentioned above.

Accordingly, the packing of the present invention avoids the use of seals or components made of elastomeric material and instead, uses material of a type that is not adversely affected by fluids of the types mentioned.

It is, therefore, an object of the present invention to provide an improved packing for a fluid joint.

Another object is to provide a packing for a swivel joint which maintains a fluid-tight seal even when exposed to a wide range of temperature conditions in the handling of destructive fluids under various pressure conditions.

Another object is to provide an improved seal for a fluid joint.

Another object is to provide an improved dynamic seal for a swivel joint.

Another object is to provide an improved packing for a fluid joint in which the sealing effect achieved thereby is proportional to the pressure of the fluid in the joint during upward variations in the pressure thereof.

These and other objects and advantages of the present invention will become apparent upon reference to the following description and the accompanying drawings in which:

FIGURE 1 is an axial section through a swivel joint and a packing embodying the present invention.

FIGURE 2 is an enlarged fragmentary perspective showing a cross sectional detail of one seal employed in the packing of FIGURE 1.

FIGURE 3 is a fragmentary axial section of a swivel joint similar to that shown in FIGURE 1 and in which a seal of the type shown in FIGURE 2 is used alone to seal the joint.

FIGURE 4 is an axial section of a swivel joint similar to the one shown in FIGURE 1 and in which a modified form of packing is used.

Referring more particularly to FIG. 1, the swivel joint shown therein, identified by the numeral 10, includes a female conduit 12, and a male conduit 14 rotatably mounted within the female conduit by balls 16 in raceways 18 formed in the conduits. The balls 16 are retained in their respective raceways by a plug 22, in a well-known manner.

The swivel joint 10 has an annular chamber 24 which circumscribes the flow passage 25 through the joint. The chamber is defined by a first radial wall 26, comprising an annular surface of the female conduit 12; a second radial wall 28, comprising an annular surface of the male conduit 14 and in confronting relation to the radial wall 26; and a cylindrical wall 30 projecting from the wall 26 toward the wall 28.

The joint 10 includes an annular nose piece 42 preferably formed of metal, which has inner and outer coaxial cylindrical surfaces 44 and 46 and opposite radial surfaces 48 and 50. In the present fluid joint, the nose piece 42 is mounted on the male conduit 14 in coaxial alignment therewith, with the surface 48 of the former attached as by silver solder to the end wall 28. When the nose piece 42 is so disposed, the inner and outer cylindrical surfaces 44 and 46 are in substantial alignment with the wall of the flow passage 25 and the outer cylindrical surface of the adjacent end portion, respectively, of the male conduit 14.

A packing 54 employed in the swivel joint 10 includes a rigid annular seal 56 which has inner and outer coaxial cylindrical surfaces 58 and 60 and opposite radial surfaces 62 and 64. As shown in FIG. 1, the seal 56 is received in the annular chamber 24 with the radial surface 62 contacting the surface 50 of the nose piece 42 and the surface 64 in confronting, axially spaced relation to the radial wall 26. The outer cylindrical surface 60 is of smaller diameter than the cylindrical wall 30 to enable the seal 56 to move lengthwise of the chamber 24 yet prevent undesirable misalignment thereof with the conduits 12 and 14.

In order to prevent rotation of the seal 56 with respect to the female conduit 12 and yet enable it to move in an axial direction in the chamber, for a purpose later to become apparent, a set screw 66 is threaded in a radial direction through the wall portion of the female conduit and has its inner tip slidably received in a longitudinal slot 68 in the outer cylindrical surface 60 of the seal 56.

In addition to the seal 56, packing 54 (FIGS. 1 and 2) also includes an annular static seal 76 of flexibly resilient material. This seal is of V-shaped cross section, having opposite legs providing generally frusto-conical walls 78 and 80. These walls project symmetrically to each side of an imaginary radial plane P (FIG. 1), where they are joined together in forming an annular ridge 81 having a cylindrical periphery 82. Although the periphery 82 is shown to be of substantially the same diameter as the cylindrical wall 30 it is, nevertheless, of slightly smaller diameter so that the static seal 76 will fit closely into the chamber 30 but enable the ridge 81 to move in an axial direction therein. The generally frusto-conical walls 78 and 80 (FIG. 2) are inwardly bowed and taper toward annular radial edge faces 84 and 86, respectively at their distal ends. It will be apparent from FIG. 1 that the radial edge faces 84 and 86 are coaxial with the periphery 82.

The static seal 76, as part of the packing 54 in the assembled swivel joint 10, has its radial edge faces 84 and 86 in engagement with the radical surface 64 of the seal 56 and the wall 26 of the female conduit, respectively. When so positioned, the static seal is compressed in an axial direction so that the generally frusto-conical walls 78 and 80 are flexed inwardly, as exaggeratedly illustrated in phantom in FIG. 2, from the normal position they would assume when the seal is not in use, as shown in full lines in this figure.

It will be apparent that the outward, axially directed force exerted by the resilience of the generally frusto-conical walls 78 and 80 is effective to maintain the radial surface 62 of the seal 56 in fluid-tight dynamic sealing relation with the surface 50 of the nose piece 42. Furthermore, this resilient force also maintains the edge face 86 of the static seal in fluid-tight sealing relation with the wall 26 of the female conduit and the edge face 84 in sealing relation with the seal 56, where it has sealing engagement with the radial surface 64.

When the components of the packing 54 are disposed in the swivel joint 10 in the manner described above, fluid conducted through the flow passage 25 thereof, is sealed against leakage between the relatively rotatable conduits 12 and 14. Since the interior of the static seal 76 is in communication with the fluid in the swivel joint, upward variations in the pressure of the fluid will tend to straighten or extend the inwardly bowed generally frusto-conical walls 78 and 80. This presses the radial end faces 84 and 86 more firmly against their opposing surface. As a result, fluid-tight relation is maintained between the parts of the packing as well as between the packing and the conduits 12 and 14 that is proportional to such rises in the pressure of the fluid in the joint. Because of the inwardly bowed configuration and resiliency of the generally frusto-conical walls 78 and 80, they can withstand the outward flexing and straightening effect resulting from the upward pressure variations without being permanently deformed.

The resilience of the static seal 76 additionally compensates for wear at the interfaces of the packing components 56 and 76 and the joint conduits 12 and 14 that might result from use of the joint and the pivoting movement of the conduits.

Although the nose piece 42 has been described hereinbefore as preferably formed of metal and attached as by silver solder to the radial wall 28, it can as well be made of certain ceramic materials. In the event ceramic material is used for this purpose, the nose piece might be recessed into the radial wall 28 and secured thereto as by a shrink fit.

It will be noted (FIG. 1) that the dynamic surface 62 of the seal 56 is of relatively small radial dimension, as compared to the radial surface 50 of the nose piece 42. By varying either or both the radial dimension and the mean diameter of the dynamic surface 62, the sealing pressure on this surface can be controlled so that the wear at the interface between the seal 56 and the nose piece is reduced to a minimum. In addition, the amount of torque required to rotate one conduit 12 or 14 of the swivel joint 10 with respect to the other can be controlled in the same way.

It is possible, in a swivel joint such as joint 10a of FIG. 3, to employ the seal 76 of FIGS. 1 and 2 to perform a dynamic sealing function. In such an arrangement, the seal 76 is received in the chamber 24a with the seal under compression in an axial direction by engagement of the radial end faces 84 and 86 in sealing relation with the radial walls 26a and 28a of the assembled female and male conduits 12a and 14a.

It will be understood that when the seal 76 is employed in performing a dynamic sealing function, the confronting radial walls 26a and 28a of the joint 10a can, if desired, be provided with wear resistant surfaces such as provided by the nose piece 42 shown in FIG. 1, which will be described later herein.

The dynamic sealing effect obtained by use of the seal 76 in the swivel joint 10a results from the resilience of the outwardly bowed generally frusto-conical walls 78 and 80 and the action of the fluid pressure thereagainst, as previously described.

The packing 100 (FIG. 4) is a modification of the packing 54 of FIG. 1 and is employed in a swivel joint 10b which is similar to the swivel joint 10 of FIG. 1. The packing 100 comprising a rigid annular dynamic seal member 116, having inner and outer coaxial cylindrical surfaces 118 and 120 opposite radial surfaces 122 and 124.

An annular static seal member 125 of flexibly resilient material and comprising part of the packing 100 has a cylindrical lip 126 and an annular inwardly bowed generally frusto-conical wall 128. The generally frusto-conical wall 128 extends from the lip 126 and tapers to a radial end face 130 which is coaxial with the lip 126. The tapering generally frusto-conical wall 128 and its radial end face 130 are substantially the same in cross section and correspond in function to the generally frusto-conical wall 80 and its radial end face 86 of the static seal 76, shown in FIG. 1. The lip 126 encircles the dynamic seal member 116 and is fixed to the outer cylindrical surface 120 thereof, as by silver solder if the packing members are made of metal to provide a fluid-tight connection between the dynamic seal member 116 and the static seal member 125. The diameter of the packing 100, as determined by the outer diameter of the lip 126, is such as to enable it to slide in an axial direction in the chamber 24b but prevent misalignment of the packing therein.

When the packing 100 is disposed in the chamber 24b of the assembled swivel joint 10b, it is compressed in an axial direction so that the generally frusto-conical wall 128 is flexed inwardly. It will be apparent that the outwardly directed axial force exerted by the resilience of the generally frusto-conical wall 128 is effective to maintain the edge face 130 of the static seal member 125 in fluid-tight relation with the radial wall 26b of the female conduit 12b and to maintain the radial surface 122 of the dynamic seal member 116 in fluid-tight dynamic sealing relation with the surface 50b of the nose piece 42b.

In order to prevent rotation of the packing 100, yet enable it to move in an axial direction in the chamber 24b, the packing is provided with tongues 136 which project radially from the lip 126 and are slidably received in axially extending slots 138 (FIG. 4) in the cylindrical wall 30b of the annular chamber 24b.

When the components of the packing 100 are disposed in the swivel joint 10b in the manner described above, fluid conducted through the flow passage 25b thereof is sealed against leakage between the relatively rotatable conduits 12b and 14b. Since the inner surface of the generally frusto-conical wall 128 is in direct contact with the fluid in the swivel joint, upward variations in the pressure of the fluid will tend to straighten or extend the inwardly bowed generally frusto-conical wall 128. This presses the radial end face 130 and consequently the surface 122 also, more firmly against the opposing radial wall 26b and the radial surface 50b, respectively. Such upward variations in pressure have no permanent deforming effect on the generally frusto-conical wall 128 due to its resilience and the fact that it is inwardly bowed. As a result of the pressure against the inwardly bowed wall 128, a fluid-tight relation is maintained between the packing 100 and the conduits 12b and 14b that is proportional to such rises in the pressure of the fluid in the joint.

The resilience of the packing 100 additionally compensates for wear at the interfaces of the packing and the swivel joint conduits 12b and 14b that may result from use of the joint 10b and the pivoting movement of the conduits.

It is to be understood that the swivel joint 10b and the nose piece 42b as well as the various components of the packing 100 may be made from materials similar to those from which the joint 10 and packing 54 are made, as will hereinafter be discussed in more detail.

Similarly, nose piece 42b can be made of certain ceramic materials and finished to the same degree of accuracy as one made of metal. Such a nose piece might, if desired, be recessed into the end wall 28b and secured in place as by a shrink fit.

By varying either or both the radial dimension and the mean diameter of the dynamic surface 122 of the dynamic seal member 116, the sealing pressure on this surface can be controlled so that the wear at the interface between the packing 100 and the nose piece 42b is reduced to a minimum. Also, by varying these dimensions of the dynamic surface 122 the torque required to rotate one of the conduits 12b or 14b with respect to the other can be controlled.

When the conduits 12 and 14, 12a and 14a or 12b and 14b shown in FIGS. 1, 3 and 4, respectively, are, for example, made of 17–4PH stainless steel, hardened to a 40–45 Rockwell (C scale) reading, the swivel joints 10, 10a and 10b satisfactorily resist wear and the damaging effects of such fluids as those mentioned above. It has been found that when the swivel joints mentioned above are composed of this particular type of stainless steel the packing 54 of FIG. 1, the seal 76 of FIG. 3 and the packing 100 of FIG. 4 have given acceptable wear and corrosion resistance when they have, for instance, been made of such metals as the following: 17–7PH stainless steel or Inconel-X for the seal 76 shown in FIGS. 1, 2 and 3 and the seal member 125 of FIG. 4 and 430F stainless steel, Stoodite No. 1 or Vascojet tool steel hardened to a Rockwell (C scale) reading in the order of 60 to 70 for the seal 56 of FIG. 1 and the dynamic seal member 116 of FIG. 4.

When it is desired to use a nose piece made of metal for attachment to the inner end wall 28, 28a or 28b of the male conduits 14, 14a or 14b it may be made of 430F stainless steel, Stoodite No. 1 or Vascojet tool steel hardened to the degree mentioned above to give satisfactory service in use with the seal elements made of the materials described hereinbefore.

For best results the radial surfaces of the chambers 24, 24a and 24b of FIGS. 1, 3 and 4, respectively, and those of the associated packing or seal and nose piece, at the various interfaces should be flat to within two light bands and be finished as by lapping to a smoothness of 6 RMS (root mean square); however, it is to be understood that the subject packing will function, although somewhat less efficiently, if such interfaces do not have this degree of flatness.

From the foregoing, it will be evident that the apparatus of the present invention fulfills the objects for which it is provided, as stated earlier herein.

Although a preferred embodiment of the present invention and certain modifications thereof have been shown and described, it will be understood that various changes and other modifications may be made in the details thereof without departing from the spirit and scope of the appended claims.

Having described the invention, what is claimed to be new and desired to be protected by Letters Patent is:

1. In a fluid joint including conduits having spaced confronting transverse walls circumscribing a longitudinal flow passage for conducting fluid through the joint, an annular packing circumscribing the flow passage and disposed in the space between said confronting walls, said packing including an end surface having sealing engagement with one of said walls, and a flexibly resilient pressure extensible portion having at least one annular flange of generally frusto-conical configuration extending radially inwardly from an outer annular rim, said flange being inwardly bowed and having an annular end surface sealingly engaging the other of said walls, said pressure extensible portion resiliently retaining said packing in fluid-tight engagement with said walls and being in communication with fluid conducted through the joint and responsive to upward variations in the pressure thereof to maintain a fluid-tight relation between said packing and said walls that is proportional to said variations in the pressure of the fluid, the engagement of said pressure extensible portion of said packing with the other of said walls being confined during all conditions of pressure to said annular end surface of said annular flange owing to the resilience and the inward bowing of said flange.

2. The fluid joint set forth in claim 1 wherein said flange of said flexibly resilient pressure extensible portion is tapered toward its annular end surface.

3. The combination set forth in claim 1 wherein said end surface is provided by a rigid annular member having opposite transverse end surfaces, and said flexibly resilient pressure extensible portion is provided by an annular member of flexibly resilient material with opposite pressure extensible generally frusto-conical walls projecting to each side of an imaginary radial plane, the opposite generally frusto-concial walls being joined on said imaginary plane and providing an annular ridge having a cylindrical periphery, each of said opposite generally frusto-conical walls being bowed inwardly and tapering from said ridge to an annular radial end face, the end faces of said generally frusto-conical walls engaging the other radial surface of said rigid portion and said other wall of said chamber respectively, said pressure extensible portion being in communication with the fluid conducted through the joint and responsive to upward variations in the pressure thereof to maintain a fluid-tight relation between the portions of said packing and between said packing and said walls of said chamber that is proportional to such variations in the pressure of the fluid.

4. The combination set forth in claim 1 wherein said end surface is provided by a rigid annular portion having a cylindrical outer surface, and said flexibly resilient pressure extensible portion includes a cylindrical lip and an annular conical wall tapering from said lip to an annular coaxial end face, said lip being disposed about the outer cylindrical surface of said rigid portion in fluid-tight relation therewith.

5. The combination set forth in claim 1 wherein said flexibly resilient pressure extensible portion is provided by an annular member of flexibly resilient material with opposite pressure extensible generally frusto-conical walls projecting to each side of an imaginary radial plane, the opposite generally frusto-conical walls being joined on said imaginary plane and providing an annular ridge having a cylindrical periphery, each of said opposite generally frusto-conical walls being bowed inwardly and tapering from said ridge to an annular radial end face, said pressure extensible portion being in communication with the fluid conducted through the joint and responsive to upward variations in the pressure thereof to maintain a fluid-tight relation between the portions of said packing and between said packing and said walls of said chamber that is proportional to such variations in the pressure of the fluid.

References Cited

UNITED STATES PATENTS

| | | | |
|---|---|---|---|
| 1,485,252 | 2/1924 | Denis | 277—206 X |
| 1,957,605 | 5/1934 | Lamont | 277—236 X |
| 2,305,524 | 12/1942 | Frazier-Nash | 285—91 X |
| 2,382,375 | 8/1945 | Allen et al. | 285—98 |
| 2,394,715 | 2/1946 | Phillips | 285—98 |
| 2,815,973 | 12/1957 | Jackson | 285—111 X |
| 2,969,998 | 1/1961 | Rodaway | 277—206 |
| 3,142,498 | 7/1964 | Press | 285—110 X |
| 3,184,246 | 5/1965 | Kline | 277—206 X |
| 3,207,524 | 9/1965 | Trbovich | 277—206 |

FOREIGN PATENTS 249,886  8/1926  Italy.

SAMUEL ROTHBERG, Primary Examiner

JEFFREY S. MEDNICK, Assistant Examiner

U.S. Cl. X.R.

285—98, 111, 276; 277—206, 236